United States Patent
Chien

(10) Patent No.: US 7,559,117 B2
(45) Date of Patent: Jul. 14, 2009

(54) DUAL-AXIS HINGE

(75) Inventor: Hsiang-Chi Chien, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 557 days.

(21) Appl. No.: 11/494,561

(22) Filed: Jul. 27, 2006

(65) Prior Publication Data

US 2008/0034548 A1    Feb. 14, 2008

(51) Int. Cl.
*E05D 5/10* (2006.01)
(52) U.S. Cl. .............................. 16/367; 16/330; 16/386
(58) Field of Classification Search ........... 16/337–339, 16/342, 330, 303, 374, 376, 377, 340, 367; 361/680–683, 814; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 6,798,646 B2 * | 9/2004 | Hsu | ...................... | 361/679.06 |
| 7,096,540 B2 * | 8/2006 | Watanabe et al. | ............. | 16/367 |
| 7,150,074 B2 * | 12/2006 | Shiba | .......................... | 16/367 |
| 7,165,291 B2 * | 1/2007 | Gan | ............................ | 16/367 |
| 7,203,995 B2 * | 4/2007 | Hsu et al. | ...................... | 16/330 |
| 7,401,383 B2 * | 7/2008 | Pan | ............................. | 16/367 |
| 2004/0139579 A1 * | 7/2004 | Su | ............................... | 16/351 |
| 2005/0055806 A1 * | 3/2005 | Shiba | .......................... | 16/341 |
| 2005/0150080 A1 * | 7/2005 | Lu et al. | ....................... | 16/367 |
| 2005/0150081 A1 * | 7/2005 | Gan | ............................ | 16/367 |
| 2005/0198779 A1 * | 9/2005 | Jung et al. | .................... | 16/367 |
| 2007/0169316 A1 * | 7/2007 | Lu et al. | ....................... | 16/367 |

* cited by examiner

*Primary Examiner*—Chuck Y. Mah
(74) *Attorney, Agent, or Firm*—William E. Pelton, Esq.; Cooper & Dunham LLP

(57) ABSTRACT

A dual-axis hinge, comprises a body, a pintle, a mounting leaf, a resilient element and a mounting bracket. The body is tubular and has two ends. The pintle is mounted inside and protrudes transversely from the body and has an upper end and a flange that protrudes radially out from the upper end. The mounting leaf is mounted rotatably around the pintle between the flange and the body and attaches to a cover of an electronic device. The resilient element is mounted around the pintle between the flange and the mounting leaf. The mounting bracket is connected rotatably to one end of the body and a base of an electronic device. With such an arrangement, the dual-axis hinge only has a few components in a simple structure and allows the cover to lift from the base and rotate horizontally relative to the base.

4 Claims, 7 Drawing Sheets

DUAL-AXIS HINGE

BACKGROUND OF THE INVENTION

1. Field of the Invention

The present invention relates to a hinge, and more particularly to a dual-axis hinge that has a few components in a simple structure.

2. Description of Related Art

Electronic devices with hinged covers such as notebook computers, cellular phones and the like are common in people's life. Generally, such an electronic device comprises a base, a cover and a hinge. The cover usually has a display. The hinge pivotally connects the cover to the base, and the cover pivots away from the base when the electronic device is being used.

To provide additional flexibility, dual-axis hinges have been further developed and allow covers to be rotated after the covers are pivoted respectively away from the bases.

However, conventional dual-axis hinges tend to have a very complicated structure and be composed of many components so manufacturing conventional dual-axis hinges is inevitably expensive and time-consuming. Furthermore, conventional dual-axis hinges are normally not able to hold the covers in position relative to the bases.

To overcome the shortcomings, the present invention provides a dual-axis hinge to obviate or mitigate the aforementioned problems.

SUMMARY OF THE INVENTION

The main objective of the present invention is to provide a dual-axis hinge that has a few components in a simple structure.

To achieve the objective, the dual-axis hinge in accordance with the present invention comprises a body, a pintle, a mounting leaf, a resilient element and a mounting bracket.

The body is tubular and has two ends. The pintle is mounted inside and protrudes transversely from the body and has an upper end and a flange that protrudes radially out from the upper end. The mounting leaf is mounted rotatably around the pintle between the flange and the body and attaches to a cover of an electronic device. The resilient element is mounted around the pintle between the flange and the mounting leaf. The mounting bracket is connected rotatably to one end of the body and a base of an electronic device. With such an arrangement, the dual-axis hinge only has a few components in a simple structure and allows the cover to lift from the base and rotate horizontally relative to the base.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
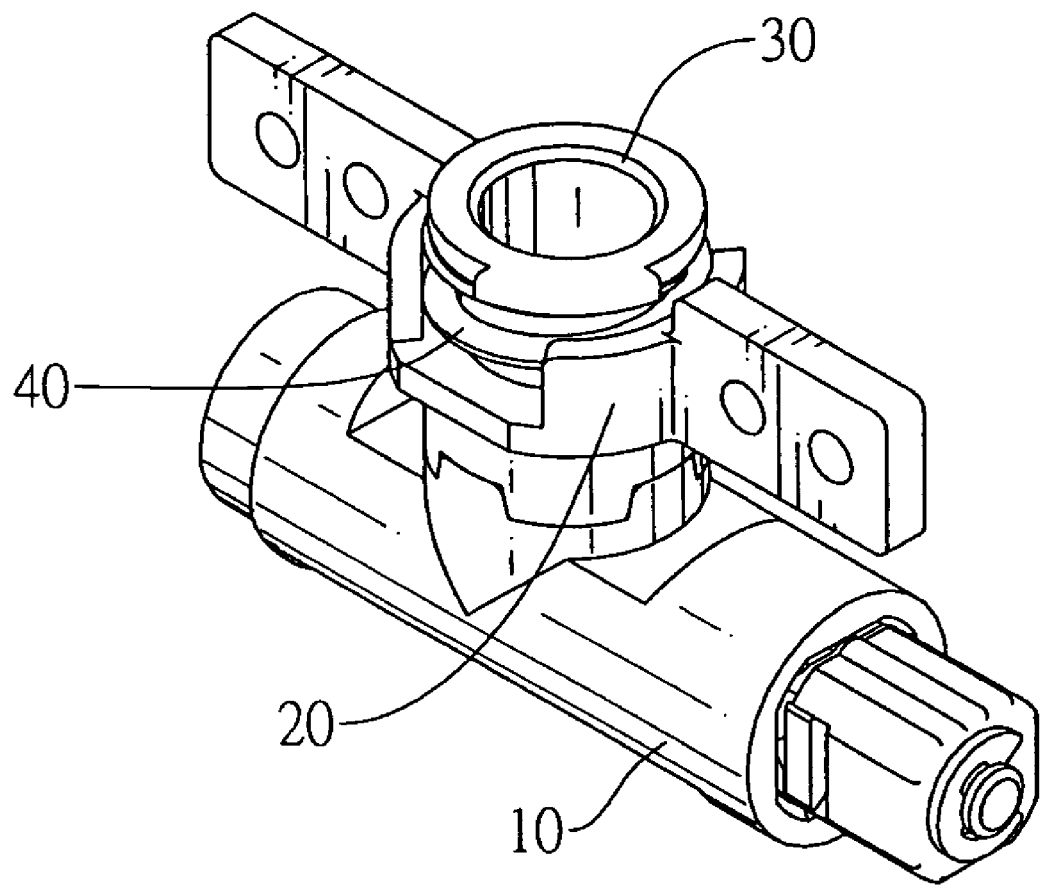
FIG. 1 is a perspective view of a dual-axis hinge in accordance with the present invention.
Figure 2:
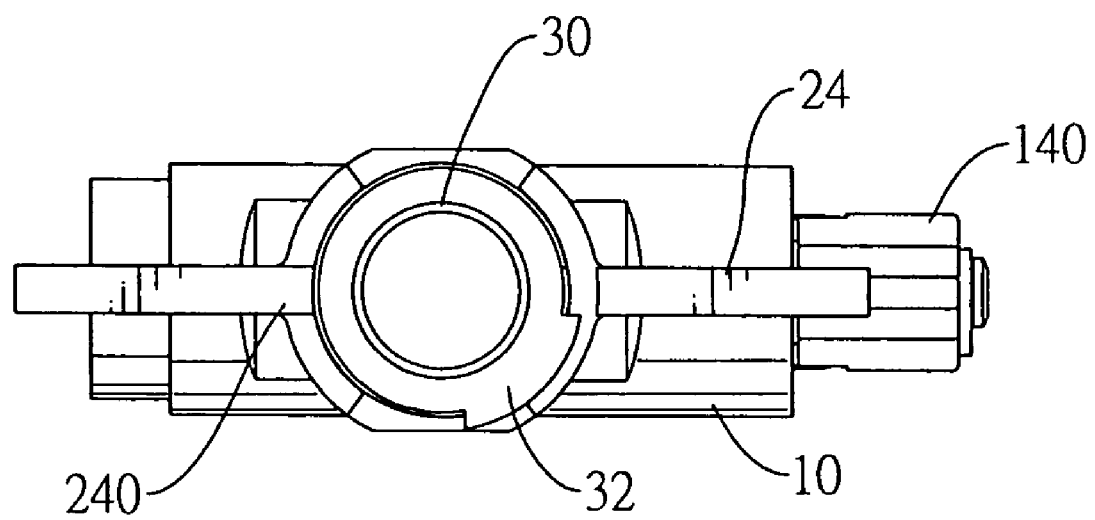
FIG. 2 is a top view of the dual-axis hinge in FIG. 1.
Figure 3:
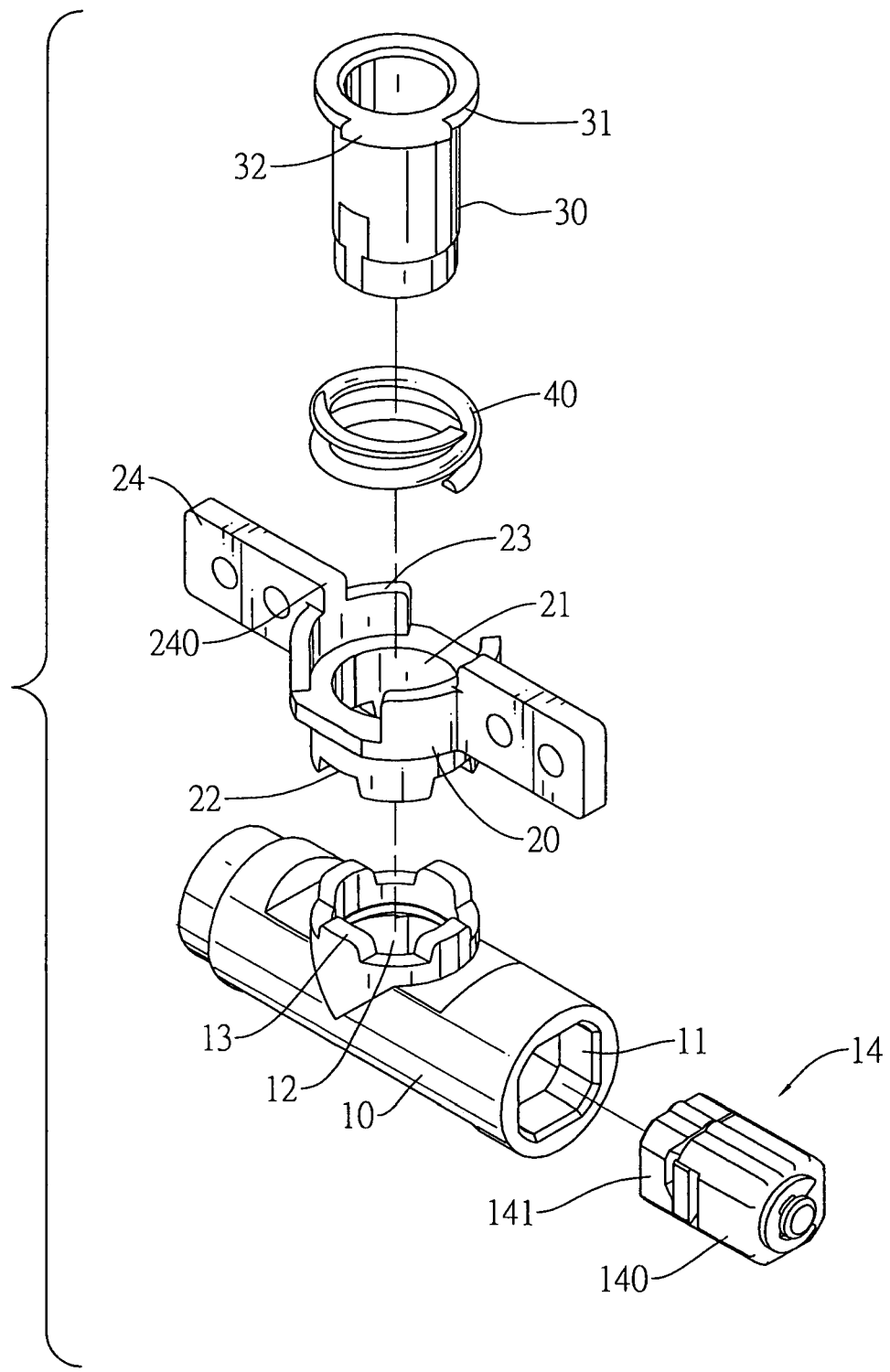
FIG. 3 is an exploded perspective view of the dual-axis hinge in FIG. 1.

With reference to FIGS. 1, 2 and 3, a dual-axis hinge in accordance with the present invention comprises a body (10), a pintle (30), a mounting leaf (20), a resilient element (40) and a mounting bracket (14).

The body (10) is tubular and has a surface, two ends, an optional keyed hole (11) and a transverse hole (12). The keyed hole (11) is formed coaxially in one end of the body (10). The transverse hole (12) is defined through the surface and has a cylindrical lip and multiple protrusions (13). The cylindrical lip is formed on and protrudes out from the surface of the body (10) around the transverse hole (12) and has a distal edge. The protrusions (13) are formed on and protrude from the distal edge of the cylindrical lip of the transverse hole (12).

The pintle (30) is mounted securely in and protrudes out of the transverse hole (12) in the body (10), has an inner end and an upper end. The inner end of the pintle (30) is attached to the body (10) by soldering, compression fit, riveting or the like. The upper end of the pintle (30) has a flange (31) and an optional limit (32). The flange (31) is formed on and protrudes radially out from the upper end. The limit (32) protrudes radially out from the flange (31) and subtends a specific angle.

Figure 4:
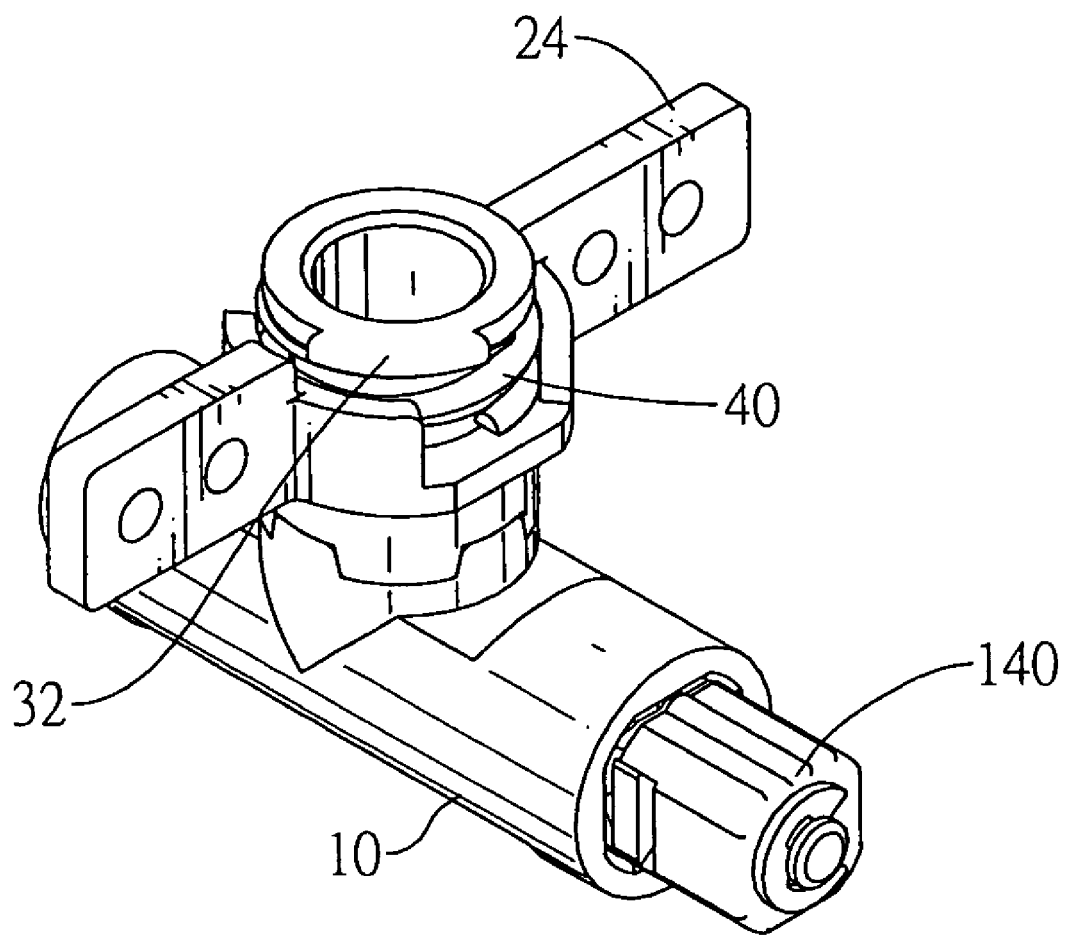
FIG. 4 is an operational perspective view of the dual-axis hinge in FIG. 1 with the leaves turned perpendicular to the body.
Figure 5:
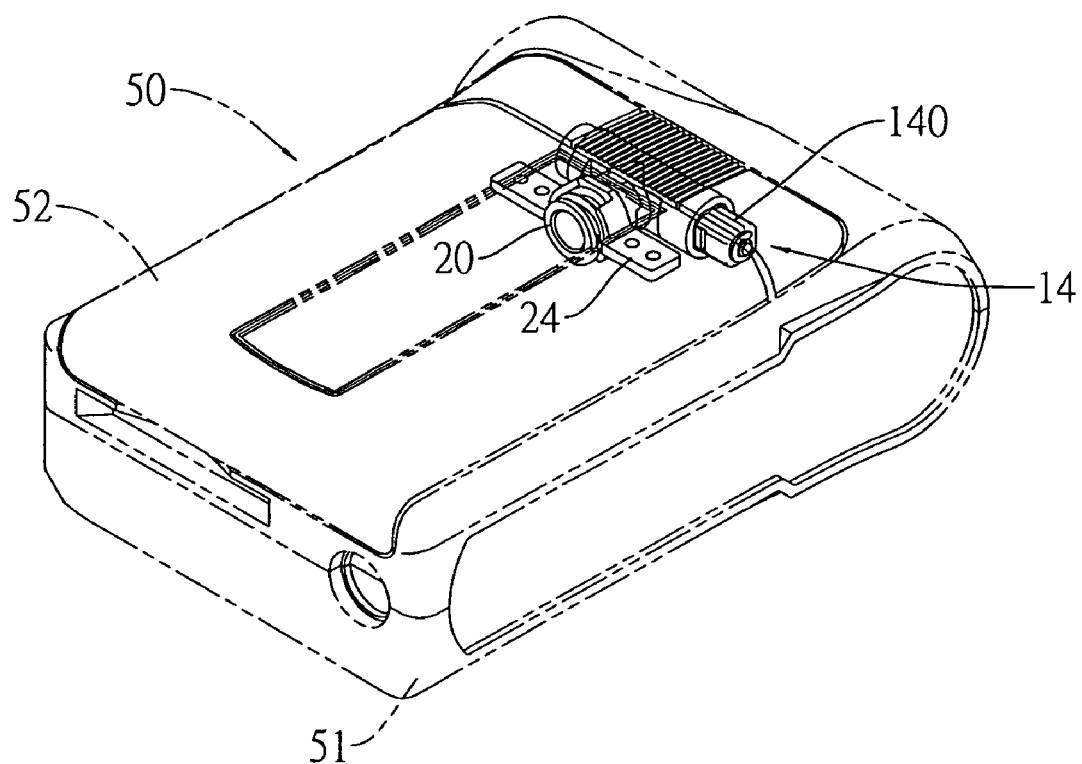
FIG. 5 is an operational perspective view of the dual-axis hinge in FIG. 1 mounted in an electronic device.
Figure 6:
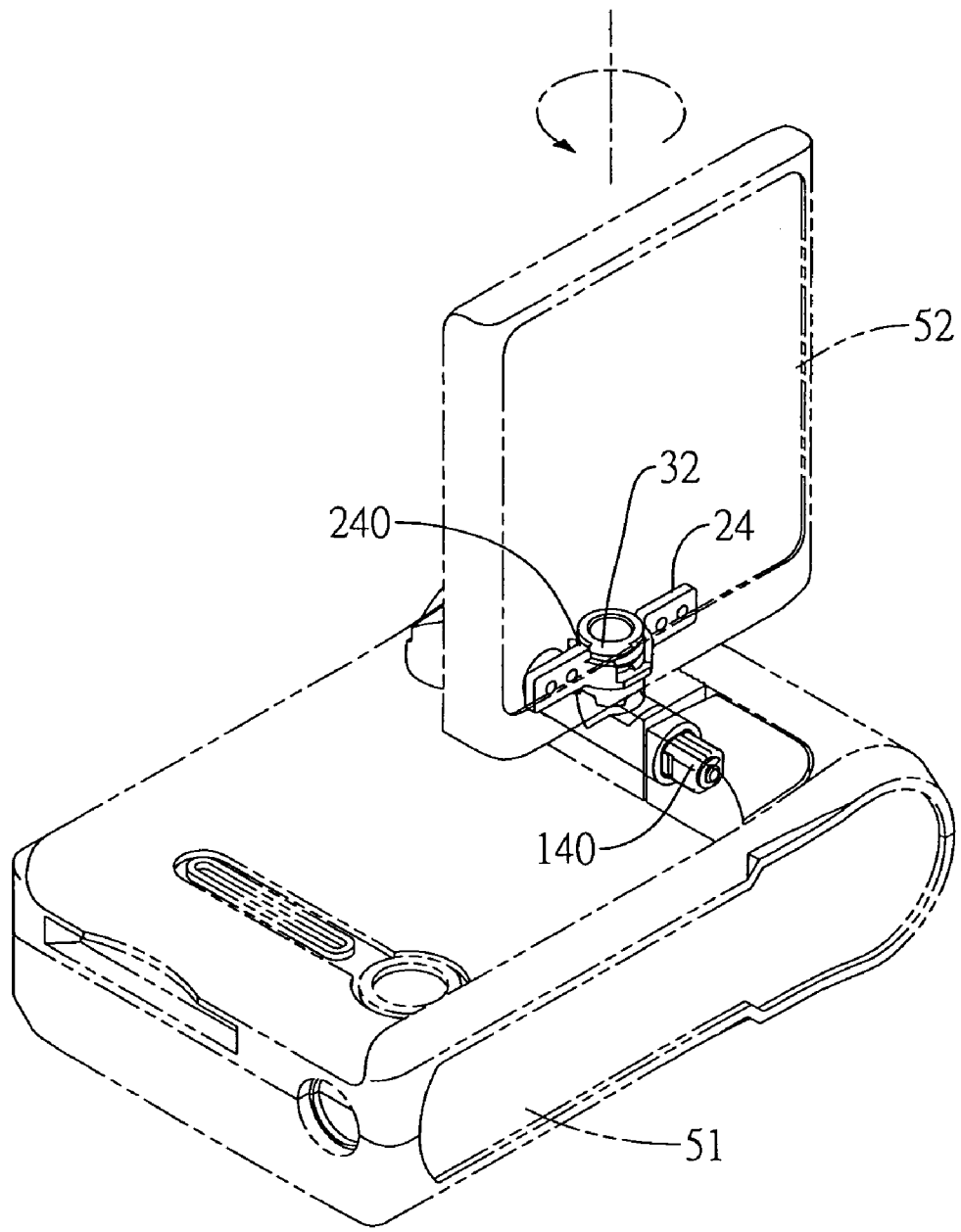
FIG. 6 is an operational perspective view of the electronic device in FIG. 5 showing the limit blocks the protrusion when the cover rotates to a determined angle.
Figure 7:
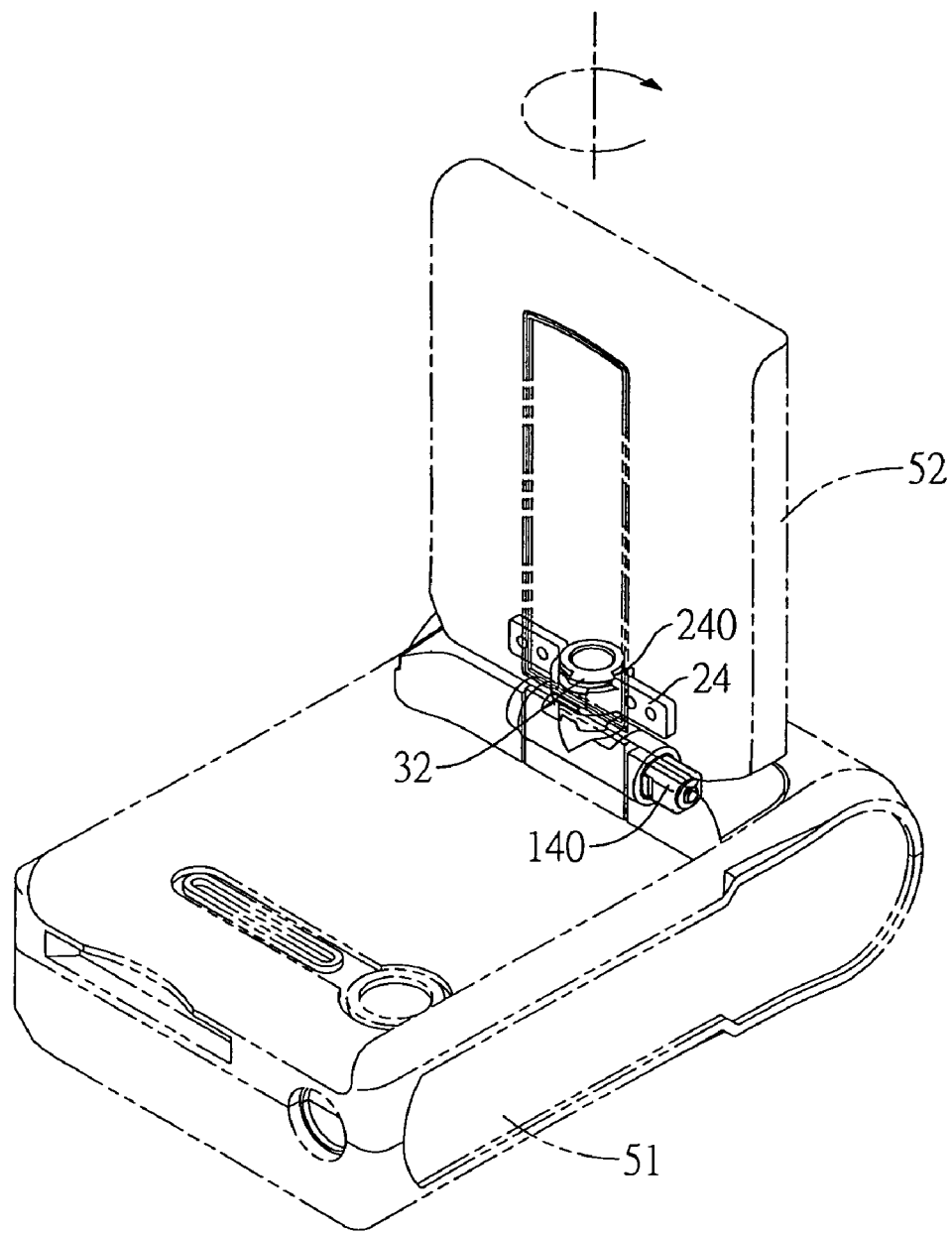
FIG. 7 is an operational perspective view of the electronic device in FIG. 5 showing the limit blocks the protrusion when the cover rotates to an another determined angle.

With further reference to FIGS. 4 and 5, the mounting leaf (20) is mounted rotatably around the pintle (30), is attached to a cover (52) of an electronic device (50) and comprises a top, a bottom, two optional sidewalls (23), two optional leaves (24) and a tubular base (21). The sidewalls (23) are formed diametrically opposite to each other and protrude up from the top of the mounting leaf (20), and each sidewall (23) has a top edge and an outer surface. The leaves (24) protrude respectively from the outer surfaces of the sidewalls (23) diametrically opposite to each other and are perpendicular to the pintle (30), one leaf (24) is further formed on and protrudes up from the top edge of the corresponding sidewall (23) to form a stop (240), and each leaf (24) has multiple threaded holes. With further reference to FIGS. 6 and 7, the stop (240) moves around the flange (31) on the pintle (30) and abuts the limit (32) to limit angular rotation of the mounting leaf (20). The threaded holes allow the mounting leaf (20) to be attached to a cover (52) of an electronic device (50). The tubular base (21) is formed on and extends down from the bottom of the mounting leaf (24), is mounted rotatably around the pintle (30), corresponds to the cylindrical lip around the transverse hole (12) in the body (10) and has a bottom edge and multiple detents (22). The detents (22) are defined in the bottom edge of the tubular base (21) and correspond to and selectively engage the protrusions (13) on the distal edge of the cylindrical lip of the transverse hole (12) on the body (10).

The resilient element (40) is mounted around the pintle (30) between the flange (31) and the top of the mounting leaf (20) and inside the sidewalls (23) of the mounting leaf (20) and pushes the tubular base (21) of the mounting leaf (20) against the distal edge of the cylindrical lip of the transverse hole (12) on the body (10). When the detents (22) engage the protrusions (13), the mounting leaf (20) and an attached cover (52) are held in position.

The mounting bracket (14) has a rotating element (141) and a stationary element (140). The rotating element (141) is rotatable relative to the stationary element (140) and is coaxially mounted securely in one end of the body (10) and may be mounted in the keyed hole (11). With further reference to FIG. 5, the stationary element (140) is mounted securely in a base (51) of an electronic device (50).

The dual-axis hinge has the following advantages. First, a few components are used in a simple structure, so the manufacturing process for the dual-axis hinge in accordance with the present invention is less expensive and saves time. Moreover, the protrusions (13) and the detents (22) hold the cover (52) in position when the cover (52) is rotated relative to the base (51). Furthermore, the angle that the mounting leaf (20) can rotate is limited by the limit (32), so cables and wires between the cover (52) and the base (51) will not twist excessively and become tangled.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A dual-axis hinge comprising
   a body having
      a surface;
      two ends; and
      a transverse hole being defined through the surface and having
         a cylindrical lip being formed on and protruding out from the surface of the body around the transverse hole and having a distal edge; and
         multiple protrusions being formed on and protruding from the distal edge of the cylindrical lip of the transverse hole;
   a pintle being mounted securely in and protruding out of the transverse hole in the body and having
      an inner end being attached to the body; and
      an upper end having a flange being formed on and protruding radially out from the upper end;
   a mounting leaf being mounted rotatably around the pintle and comprising
      a top;
      a bottom; and
      a tubular base being formed on and extending down from the bottom of the mounting leaf, being mounted rotatably around the pintle, corresponding to the cylindrical lip around the transverse hole in the body and having
         a bottom edge; and
         multiple detents being defined in the bottom edge of the tubular base and corresponding to and selectively engaging the protrusions on the distal edge of the cylindrical lip of the transverse hole on the body;
   a resilient element being mounted around the pintle between the flange and the top of the mounting leaf and pushing the tubular base of the mounting leaf against the distal edge of the cylindrical lip of the transverse hole on the body; and
   a mounting bracket having
      a rotating element being coaxially mounted securely in one end of the body; and
      a stationary element being attached rotatably to the rotating element.

2. The dual-axis hinge as claimed in claim 1, wherein
   the upper end of the pintle further has a limit protruding radially out from the flange subtending a specific angle;
   the mounting leaf further comprises
      two sidewalls being formed diametrically opposite to each other and protruding up from the top of the mounting leaf, and each wall having a top edge and an outer surface; and
      two leaves protruding respectively from the outer surfaces of the sidewalls diametrically opposite to each other and perpendicular to the pintle, and one of the leaves being further formed on and protruding up from the top edge of the corresponding sidewall to form a stop that moves around the flange on the pintle and abuts the limit to limit angular rotation of the mounting leaf.

3. The dual-axis hinge as claimed in claim 1, wherein
   the body further has a keyed hole being formed coaxially in one end of the body; and
   the rotating element of the mounting bracket is mounted in the keyed hole.

4. The dual-axis hinge as claimed in claim 2, wherein each leaf of the mounting leaf further has multiple threaded holes.

* * * * *